Sept. 10, 1940.        H. T. RIGHTS        2,214,595
ILLUMINATED DIAL INSTRUMENT
Filed Sept. 3, 1937

WITNESSES:

INVENTOR
Herbert T. Rights
BY
ATTORNEY

Patented Sept. 10, 1940

2,214,595

UNITED STATES PATENT OFFICE 2,214,595

ILLUMINATED DIAL INSTRUMENT

Herbert T. Rights, West Orange, N. J., assignor to Westinghouse Electric & Manufacturing Company, East Pittsburgh, Pa., a corporation of Pennsylvania Application September 3, 1937, Serial No. 162,235

5 Claims. (Cl. 240—2.1)

The present invention relates to indicating measuring instruments, and instruments generally, and particularly to an improved method of illuminating the dials thereof to facilitate reading.

The problem of illuminating the dials of instruments has been receiving substantial attention in an attempt to facilitate reading when external lighting conditions are not particularly good, and to provide sufficient light to overcome the effects of glare on the transparent face of the instrument caused by external illumination.

Of course, it is relatively simple to provide an electric light bulb to cast a beam of light across the dial of an instrument, but usually this involves an increase in the size of the casing of the instrument, and is difficult to apply to instruments already in service.

It is an object of the present invention to provide a means for illuminating the dial of an instrument in which the source of light is not necessarily within the instrument casing and in which the source is not necessarily disposed adjacent to the dial which is a portion of the instrument case quite crowded by the instrument mechanism. It will also be apparent that the invention may quite readily be applied to existing instruments with but slight modification.

Other objects of the invention will appear in the following description and in the accompanying drawing, in which.

In accordance with the invention, use is made of the phenomenon of internal reflection of light through a homogeneous transparent body, such as a round rod, the surface of which is smooth and unbroken. At the point where emission of the light is desired, the surface of the rod may be roughened or the surface curvature may be altered. A rod of quartz or clear glass may have directed into one end of it a beam of light, and the beam will traverse the rod and emerge from the other end or emerge at any point where the surface curvature is such that the law of internal reflection no longer holds. Because of the internal reflection, the rod itself does not appear to be illuminated, and all of the light directed into the rod emerges from the opposite end, less the losses due to absorption of the transparent material, or less the losses due to light emerging at points along the length of the rod where the surface has been roughened or the surface curvature altered to prevent the internal reflection.

Although quartz is a very desirable material for this type of light transmission, it is quite expensive and is difficult to form to desired shapes. Some grades of glass are also suitable, but preferably it is intended that rods of synthetic transparent resins, which may be readily molded or cast, be used. Many materials of this type are available on the market under trade names of "Lucite" and "Plexiglass" and it is not considered that a detailed description of the materials is required.

Figure 1:
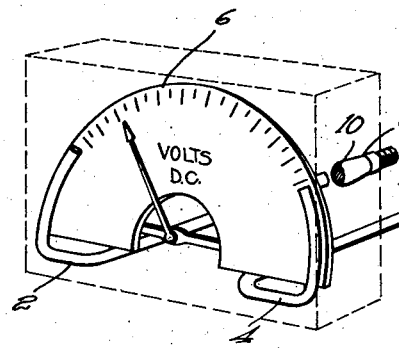
Figure 1 is a view in perspective of an illuminating means embodying the present invention, portions of the instrument casing being indicated in dotted lines.

Referring to Fig. 1, two rods 2 and 4 of transparent synthetic resin are provided. The rod 2 extends from a position at the lower end of the scale of an instrument dial 6 to the rear of such dial in line with a source of light 8 having a suitable lens 10, either built into it or mounted separately, for directing a beam of light axially of the rod. Quite apparently, the beam will traverse the rod and emerge from the end thereof to direct a beam over the lower range of the scale of dial 6. Similarly, rod 4 extends from the other end of the scale in back of the dial in line with a source 12 and lens 14. The two beams from the ends of the rods effectively illuminate the entire range of the scale.

By the construction of Fig. 1, the sources of light 8 and 12 may be mounted within the instrument casing, which is indicated in dotted lines, as the only space required within the casing is that represented by the thickness of the rods 2 and 4. Usually, there is sufficient room between the dial and glass plate of existing indicating instruments to render it a simple matter to mount the rods in the relative positions shown.

Figure 2:
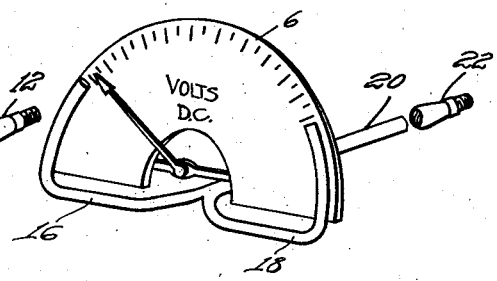
Figs. 2, 3 and 4 are views in perspective of modifications of the illuminating means shown in Fig. 1.

Fig. 2 differs from Fig. 1 in that the rods 16 and 18, corresponding to 2 and 4, respectively, in Fig. 1, are integrally joined below the dial, or in back of it, to a common section 20 in alignment with light source 22. This is desirable in many cases when the material of the rods 16, 18 and 20 is sufficiently transparent to permit the use of a single light source.

Figure 3:
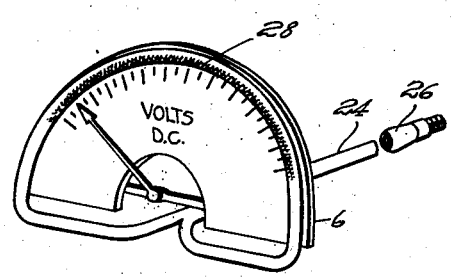

In Fig. 3, a single rod 24 is employed extending from the source 26 and encircling the entire scale of the dial. The portion of the rod surrounding the scale is preferably roughened as indicated at 28 to permit the light to emerge from the rod and illuminate the face of the dial.

Figure 5:
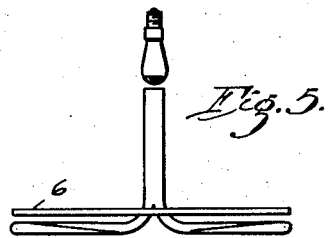
Fig. 5 is a top view of the modification shown in Fig. 4.
Figure 4:
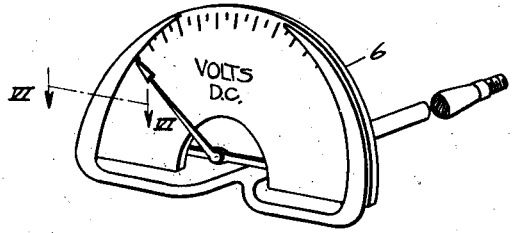
Figure 6:
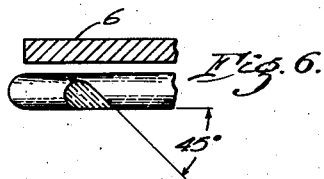
Fig. 6 is a view in section taken on the line VI—VI of Fig. 4.

In Fig. 4, the rods are arranged similarly to the arrangement in Fig. 2, but the end of each rod is beveled, as indicated in Figs. 5 and 6, to give a gradual taper toward the end of the rod. The beveled surface, which may be at about 45° with respect to the face of the dial, is polished and permits light to gradually escape therealong. The blunt ends of the rods become luminous secondary sources of illumination.

Also, in Fig. 4, the source of light is a bulb of the concentrated filament type in which the filament is as close as possible to the top of the bulb. When the bulb is mounted very close to, or in contact with, the end of the rod, a maximum amount of light enters the rod and the included angle is at a minimum.

In the case of the structures shown in Figs. 2, 3 and 4, the cross-section area of the portion of the rod adjacent to the light source should, of course, be at least twice the sectional area of either of the arms, or equal to the sum of such areas of the arms.

It is considered that by reason of the construction shown, an unusually simple and effective illuminating means is provided for measuring instruments, or for almost any purpose, where it is desired to conduct a beam of light from a remote point, or from behind the dial, to illuminate a given area of the dial. Many modifications will present themselves, but it is intended that the invention shall be limited only by the scope of the appended claims.

I claim as my invention:

1. In a device for illuminating an indicating instrument, an elongated light-conductive member for conducting light over a surface of said indicating instrument, and a source of light positioned adjacent an end of said light-conductive member, said light-conductive member having a gradually tapering cross-section in the direction of its length positioned to direct substantially all light passing therethrough onto said surface by refraction.

2. In a device for illuminating an area of an indicating instrument, an elongated light-conductive member for conducting light in a predetermined path, said light-conductive member having a light-emitting surface facing only said area and extending at an acute angle relative to said path.

3. In a device for illuminating the dial of an indicating instrument, a pair of light-conducting rods having ends extending towards each other and bordering the area of said dial to be illuminated, each of said ends having a light-emitting surface extending at an acute angle relative to the longitudinal dimension of its supporting rod and facing towards the area of said dial to be illuminated.

4. In a device for illuminating the dial of an indicating instrument, a pair of light-conducting rods having tapered ends extending towards each other and substantially bordering a portion of said dial to be illuminated, and means for supplying light to said rods for conduction therethrough to said tapered ends, said tapered ends being positioned for intercepting portions of said light and directing substantially all of the intercepted light over the portion of said dial to be illuminated.

5. In a device for illuminating the dial of an indicating instrument, a concentrated light source, an integral, light-conductive rod extending from said light source to said dial for conducting light from said light source to said dial, said light-conductive rod having a substantially plane surface extending at a small angle relative to the axis of said light-conductive rod for gradually intercepting light passing therethrough, said surface being positioned to face a portion of the dial to be illuminated.

HERBERT T. RIGHTS.